(12) United States Patent
Hitt et al.

(10) Patent No.: US 7,213,825 B2
(45) Date of Patent: May 8, 2007

(54) LEAF SPRING RETAINING BRACKET

(75) Inventors: Brian James Hitt, Hartford, WI (US); Evon Skulj, Welland (CA); William John Heska, Fonthill (CA); Michael Krasic, Hamilton (CA)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 10/777,965

(22) Filed: Feb. 12, 2004

(65) Prior Publication Data
US 2005/0179224 A1    Aug. 18, 2005

(51) Int. Cl.
B60G 11/46    (2006.01)
(52) U.S. Cl. .................. 280/124.163; 280/124.17; 280/124.174; 280/124.175
(58) Field of Classification Search ........... 280/124.13, 280/124.124, 124.163, 124.165, 124.17, 280/124.174, 124.175
See application file for complete search history.

(56) References Cited

U.S. PATENT DOCUMENTS

| 1,607,205 | A |   | 11/1926 | Lord |                      |
|-----------|---|---|---------|------|----------------------|
| 3,030,101 | A | * | 4/1962  | McIntosh | .................... 267/270 |
| 3,279,815 | A | * | 10/1966 | Hutchens | .................... 280/682 |
| 3,511,493 | A | * | 5/1970  | Burrell  | ........................ 267/47 |
| 3,799,562 | A | * | 3/1974  | Hinchliff | .................... 280/682 |
| 4,460,167 | A |   | 7/1984  | Silvis et al. | .................. 167/42 |
| 5,024,482 | A |   | 6/1991  | Isukimi et al. | .............. 296/194 |
| 5,209,518 | A | * | 5/1993  | Heckenliable et al. | ...... 280/680 |
| 5,560,641 | A |   | 10/1996 | Vogler | ........................ 280/720 |
| 5,887,881 | A |   | 3/1999  | Hatch | .................. 280/124.175 |
| 6,129,369 | A |   | 10/2000 | Dudding | .............. 280/124.175 |
| 6,485,040 | B1 |  | 11/2002 | Dudding | .............. 280/124.175 |
| 6,708,988 | B2 | * | 3/2004 | Dunlap et al. | ........... 280/6.157 |
| 2003/0034643 | A1 | | 2/2003 | Stanley | ....................... 280/788 |

FOREIGN PATENT DOCUMENTS

| DE | 42 15 112 A1 | 11/1993 |
| JP | 60261717    | 12/1985 |
| JP | 02088315    | 3/1990  |
| JP | 07164845    | 6/1995  |
| JP | 11034912    | 2/1999  |
| JP | 11165518    | 6/1999  |
| JP | 11180106    | 7/1999  |
| JP | 2003312224  | 11/2003 |

* cited by examiner

Primary Examiner—Paul N. Dickson
Assistant Examiner—Toan C. To

(57) ABSTRACT

A one-piece leaf spring retaining bracket may be welded to a longitudinal member of a vehicle frame. The leaf spring retaining bracket is symmetrical along two planes, and the same bracket may be used on either side of the vehicle frame. The bracket has an upper section with a curved or arced surface, and first and second downwardly extending walls between which the end of a leaf spring may be pivotally supported.

12 Claims, 4 Drawing Sheets

LEAF SPRING RETAINING BRACKET

FIELD OF THE INVENTION

This invention relates generally to leaf spring suspensions for small motor vehicles including utility vehicles, all terrain vehicles and similar vehicles adapted to carry one or more passengers and/or cargo. More specifically, the invention relates to a bracket to retain the end of a leaf spring to the frame of a small motor vehicle.

BACKGROUND OF THE INVENTION

A leaf spring suspension serves to position the drive train of a vehicle. For example, the rear axle may be attached with an axle mounting bracket intermediate the ends of the leaf spring. Drive train location within the vehicle frame is critical for optimum vehicle handling and performance.

To retain a leaf spring to the vehicle frame, a cross bolt may be inserted through an eye or similar structure in each end of the leaf spring. The cross bolt also may be inserted through a pair of metal plates welded or bolted to the frame, each plate positioned on one side of the end of the leaf spring.

The pair of plates for mounting the end of a leaf spring to the left side of a vehicle frame may be differently shaped than the pair of plates for mounting a leaf spring to the right side of the frame. For example, the outside plate of each pair may have a bend or contour extending outwardly from the frame. As a result, the pair of plates are not interchangeable.

In general, each plate may be heavier, thicker and/or higher strength material than the frame member to which it is attached. For example, each plate may be made from sheet steel having a thickness of about 4 mm to about 6 mm, while the vehicle frame may be made from sheet steel typically having a thickness of about 1.5 mm to about 2.5 mm.

A leaf spring retaining bracket is needed that may be used on either side of the vehicle frame. A leaf spring retaining system is needed having fewer parts. A leaf spring retaining bracket is needed that is lighter in weight, without reducing its strength.

SUMMARY OF THE INVENTION

A one-piece leaf spring retaining bracket may be welded to either side of a vehicle frame. The bracket is symmetrical along two planes. One end of the leaf spring is pivotally supported by the bracket. The bracket has an upper section with an arced shape welded to the lower surface of a longitudinal member of the frame, and first and second walls extending downwardly from the upper section. A cross bolt extends between the walls and through the eye of the first end of the leaf spring.

DESCRIPTION OF THE PREFERRED EMBODIMENT

Figure 1:
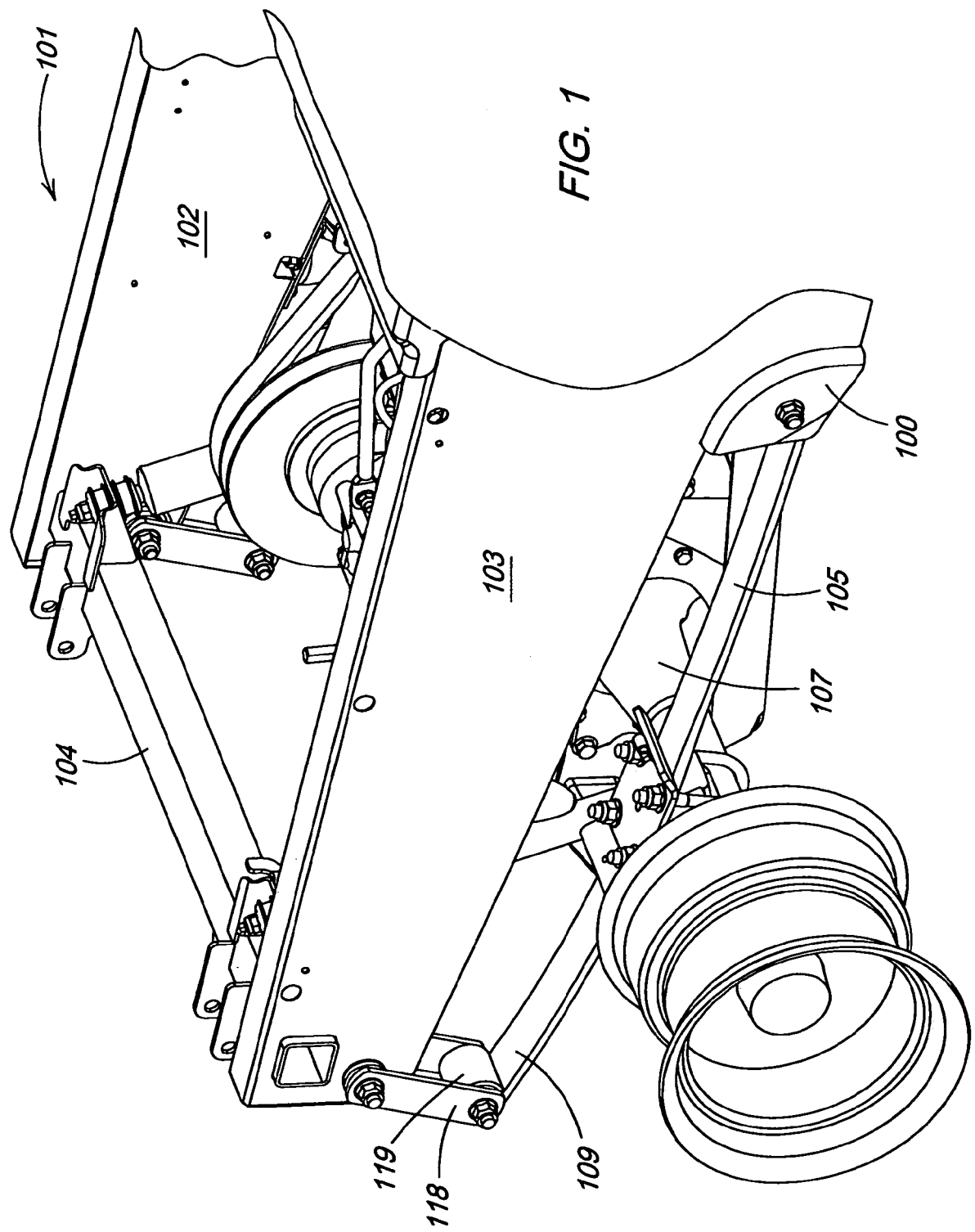
FIG. 1 is a right side perspective view of a rear portion of a small motor vehicle frame with a first embodiment of the leaf spring retaining bracket.
Figure 2:
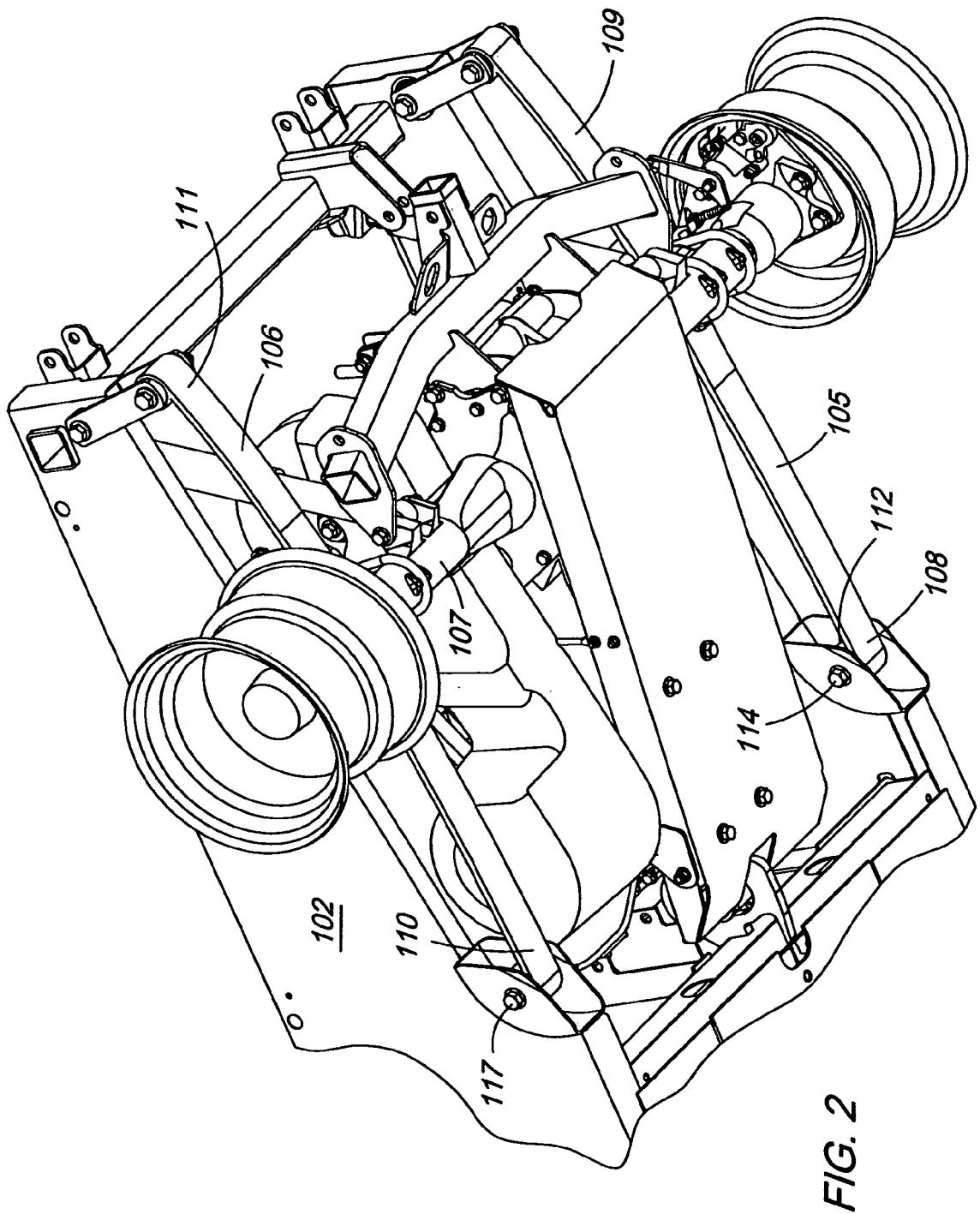
FIG. 2 is a front left perspective view of a rear portion of a small motor vehicle frame with a first embodiment of the leaf spring retaining bracket.

In FIGS. 1 and 2, a first embodiment of leaf spring retaining bracket 100 is shown welded to small motor vehicle frame 101. The frame may include first longitudinal member 102 on the left side of the frame and second longitudinal member 103 on the right side of the frame. One or more cross members 104 may link or bridge between the longitudinal members. Leaf springs 105, 106 may be positioned under the first and second longitudinal members, respectively, to support the frame over axle 107.

Leaf spring 105 has first end 108 and second end 109. Leaf spring 106 also has first end 110 and a second end 111. The leaf spring may be a parabolic leaf spring formed of metal such as steel, fiber reinforced resin such as glass fibers, or other materials know to those skilled in the art. Axle 107 may be positioned perpendicular to and intermediate the first and second ends of each leaf spring with an axle mounting bracket.

At least the first end 108 of leaf spring 105 may have an eye 112 through which cross bolt 114 may be inserted. The eye may be dimensioned so that the first end of the leaf spring may pivot on the axis defined by the cross bolt extending through the eye. A rubber damper bushing (not shown) also may be housed within the eye. Similarly, the first end 110 of leaf spring 106 may have an eye through which cross bolt 117 may be inserted, and also may house a rubber damper bushing.

In the embodiment of FIGS. 1 and 2, leaf spring 105 may be mounted to longitudinal member 103. In this embodiment, leaf spring retaining bracket 100 may be used to mount the first end of the leaf spring to the longitudinal member. The other end of the leaf spring may be mounted to the longitudinal member by conventional devices, such as pair of metal bars 118, 119 (commonly referred to as shackles).

Figure 3:
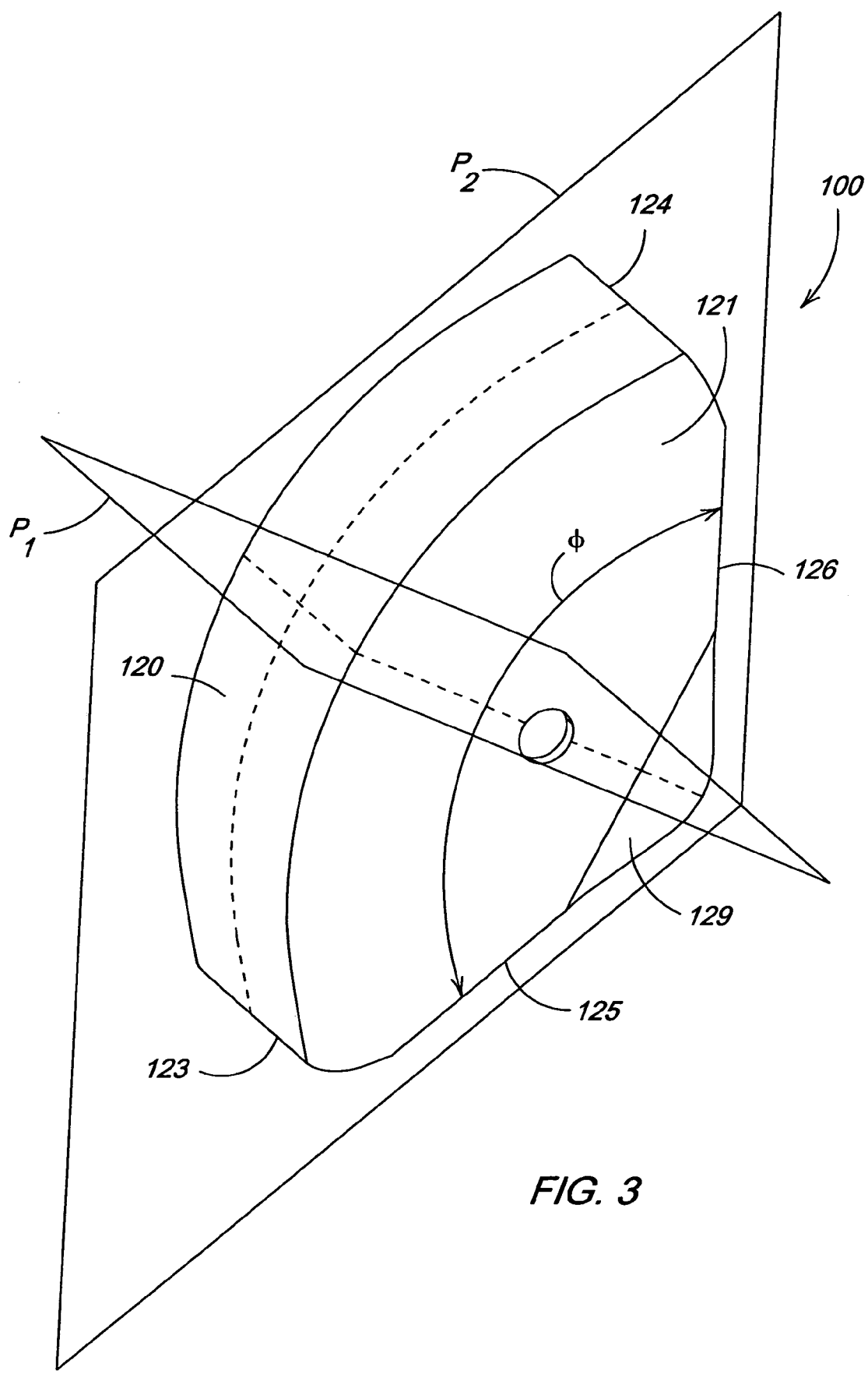
FIG. 3 is a top perspective view of a first embodiment of a leaf spring retaining bracket.
Figure 4:
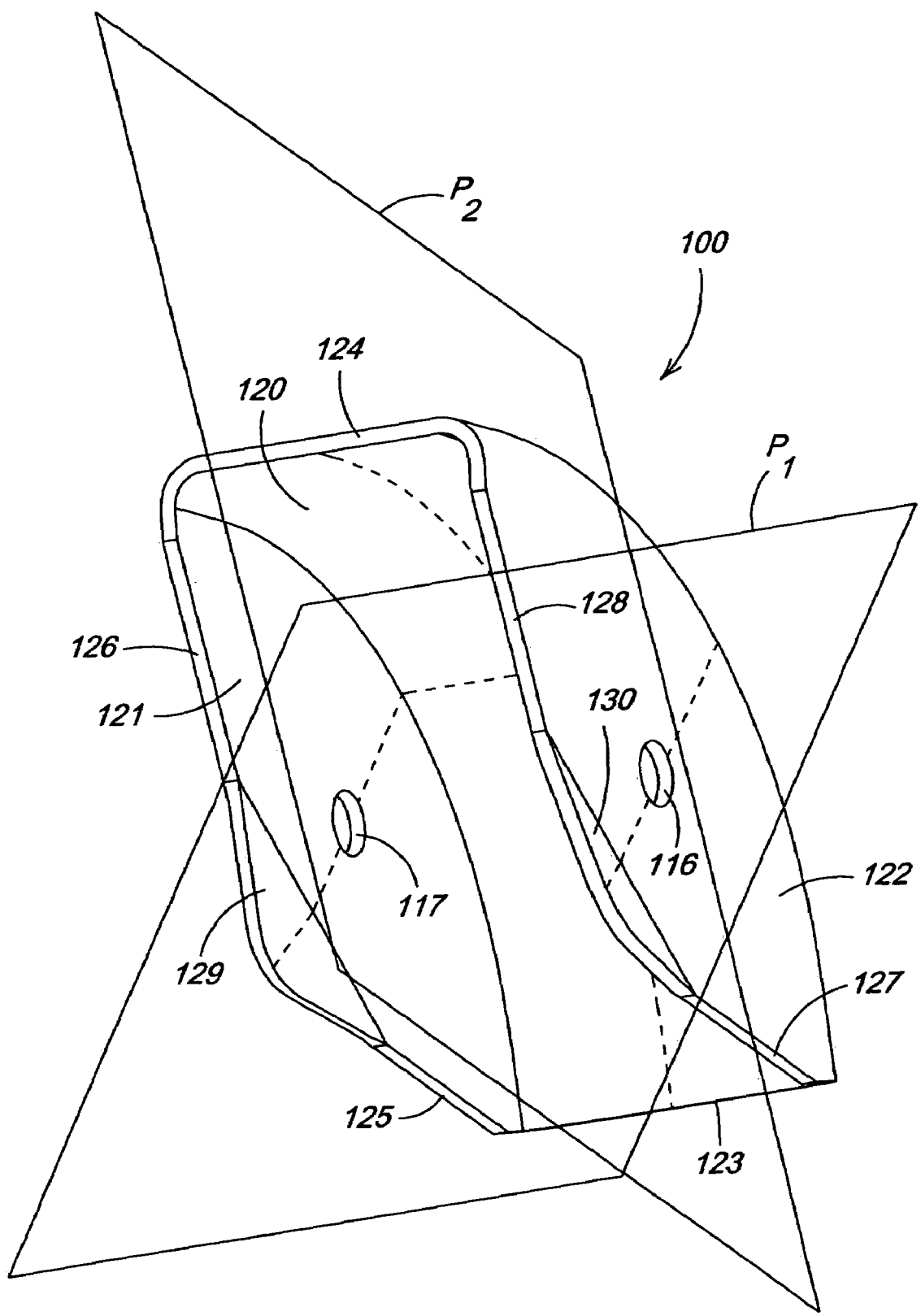
FIG. 4 is a bottom perspective view of a first embodiment of a leaf spring retaining bracket.

As shown in FIGS. 3 and 4, leaf spring retaining bracket 100 is a one-piece formed metal structure. For example, the leaf spring retaining bracket may be stamped from sheet steel. The leaf spring retaining bracket locates the eye of a leaf spring on the frame and allows the leaf spring to pivot about the axis defined by the eye.

In one embodiment, the leaf spring retaining bracket may have a substantially uniform material thickness, preferably not more than twice the material thickness of the longitudinal member of the frame. For example, the leaf spring retaining bracket may be formed from 3 mm sheet steel, while the longitudinal member of the frame may be formed from 1.6 mm sheet steel. The configuration of the leaf spring retaining bracket, as will be explained in more detail below, allows it to be made from lighter, thinner and/or lower strength material than that used for plates previously used to mount the ends of leaf springs to the frame.

In one embodiment, leaf spring retaining bracket 100 may have an upper section 120 and first and second downwardly extending walls 121, 122. The upper section of the bracket faces the vehicle frame and may be welded to a longitudinal member of the vehicle frame. The upper section of the bracket may define the maximum area for a weld to the longitudinal member of the frame. In one embodiment, the upper section of the bracket may have a width of between about one inch and about four inches, a length of between about five inches and ten inches, and a surface area of between about five square inches and about forty square inches.

In one embodiment, the upper section may define a curved or arced shape between first end 123 and second end 124. For example, the upper section may have a curved or arced shape with an angle φ of between about 90 degrees and about 180 degrees. In one embodiment, the shape of the upper section of the bracket may correspond to the shape of a lower surface of the longitudinal member of a vehicle frame. For example, a portion of the lower surface of the longitudinal member also may have a curved or arced shape.

In one embodiment, the curved or arced shape of the upper section of the bracket, after being welded to the corresponding shape of the lower surface of the longitudinal member, provides a secure connection between the end of the leaf spring and frame. For example, the upper section provides a weldable surface of the dimensions previously described, along a curved or arced surface of between about 90 degrees and about 180 degrees. The shape of the welded surface strengthens the welded connection against longitudinal forces and vertical forces that may be imparted to the end of the leaf spring.

In one embodiment, first and second downwardly extending walls 121, 122 are integral with and adjoin upper section 120. The first and second downwardly extending walls may be generally parallel to each other. Optionally, when the bracket is manufactured, the downwardly extending walls may be flared out slightly a few degrees so that the bracket may be released from the manufacturing tool. However, when the bracket is used, cross bolt 114 may be tightened sufficiently to pull the walls into parallel alignment with each other. The width of the leaf spring retaining bracket as measured between the first and second downwardly extending walls accommodates the end of a leaf spring therebetween.

Holes 116, 117 may be drilled through the first and second downwardly extending walls, the holes being dimensioned for insertion of a cross bolt therebetween, and through the eye in the end of the leaf spring. The cross bolt may be inserted through a rubber damper bushing in the eye of the leaf spring.

In one embodiment, first downwardly extending wall 121 may terminate at first pair of edges 125, 126 that are intersecting; i.e., the pair of edges are not parallel to each other. Second downwardly extending wall 122 may terminate at second pair of edges 127, 128 that also are intersecting. In one embodiment, the first downwardly extending wall may have an outwardly flared area 129 at or near the intersection of the first pair edges, and the second downwardly extending wall may have an outwardly flared area 130 at or near the intersection of the second pair of edges. The outwardly flared area may act as a lead-in for ease of insertion and assembly of the eye of a leaf spring into the leaf spring retaining bracket.

In one embodiment, leaf spring retaining bracket 100 may be symmetrical along two planes. FIGS. 3 and 4 show the leaf spring retaining bracket in relation to first plane P1 and second plane P2. The symmetry of the bracket about planes P1 and P2 allow the identical leaf spring retaining bracket to be welded to either side of the vehicle frame. Additionally, the symmetry allows each bracket to be flipped so that either of edges 123 or 124 may face the leaf spring to accept the eye of the leaf spring. For example, in the embodiment shown, either of edges 123 or 124 may face rearwardly. Symmetry of the leaf spring retaining bracket about two planes simplifies assembly procedures and reduces the number of different suspension components required.

Having described the preferred embodiment, it will become apparent that various modifications can be made without departing from the scope of the invention as defined in the accompanying claims.

The invention claimed is:

1. An apparatus comprising:
   a leaf spring having a first end with an eye;
   a retaining bracket with an arced upper section defining a weldable area of between about five square inches and about forty square inches, first and second downwardly extending generally parallel walls adjoining the arced upper section, each wall terminating at a pair of intersecting edges;
   a cross-bolt extending through the eye in the first end of the leaf spring and between the first and second downwardly extending walls; and
   a flared area between the pair of intersecting edges.

2. An apparatus comprising:
   a leaf spring having a first end with an eye;
   a retaining bracket with an arced upper section defining a weldable area of between about five square inches and about forty square inches, first and second downwardly extending generally parallel walls adjoining the arced upper section, each wall terminating at a pair of intersecting edges;
   a cross-bolt extending through the eye in the first end of the leaf spring and between the first and second downwardly extending walls; and
   a longitudinal member of a vehicle frame, at least a portion of the longitudinal member having a lower surface with an arced shape corresponding to the arced upper section.

3. The apparatus of claim 2 wherein the upper section of the retaining bracket is welded to the longitudinal member.

4. An apparatus comprising:
   a leaf spring having a first end and a second end, the first end having an eye;
   a longitudinal member of a vehicle frame having a lower surface with an arced portion;
   a one-piece leaf spring retaining bracket retaining the first end of the leaf spring to the longitudinal member, the bracket having an upper section with an arced shape welded to the arced portion of the lower surface of the longitudinal member, and first and second walls extending downwardly from the upper section; and
   a cross bolt extending between the walls and through the eye of the first end of the leaf spring.

5. The apparatus of claim 4 wherein the first and second walls are generally parallel.

6. The apparatus of claim 4 wherein the arced upper section defines an arc of between about 90 degrees and about 180 degrees.

7. The apparatus of claim 4 wherein the one-piece leaf spring retaining bracket and the longitudinal member are formed of sheet steel, the thickness of the sheet steel of the one-piece leaf spring retaining bracket being less than twice the thickness of the sheet steel of the longitudinal member.

8. The apparatus of claim 4 further comprising a pair of longitudinal members, a first longitudinal member on the left side of the vehicle frame and a second longitudinal member on the right side of the vehicle frame, the one-piece leaf spring retaining bracket being weldable to the first or the second longitudinal member to retain a leaf spring to either the first or the second longitudinal member.

9. The apparatus of claim 4 wherein the first and second walls are generally parallel and terminate at edges, each edge having an outwardly flared area.

10. The apparatus of claim 4 wherein each of the first and second walls terminates at a pair of intersecting edges.

11. The apparatus of claim 4 wherein the bracket is symmetrical with respect to a first plane and a second plane.

12. The apparatus of claim 4 further comprising holes in the first and the second walls, the cross bolt extending through the holes.

* * * * *